2,978,427
METHOD OF INCORPORATING RUBBER INTO A PETROLEUM OIL

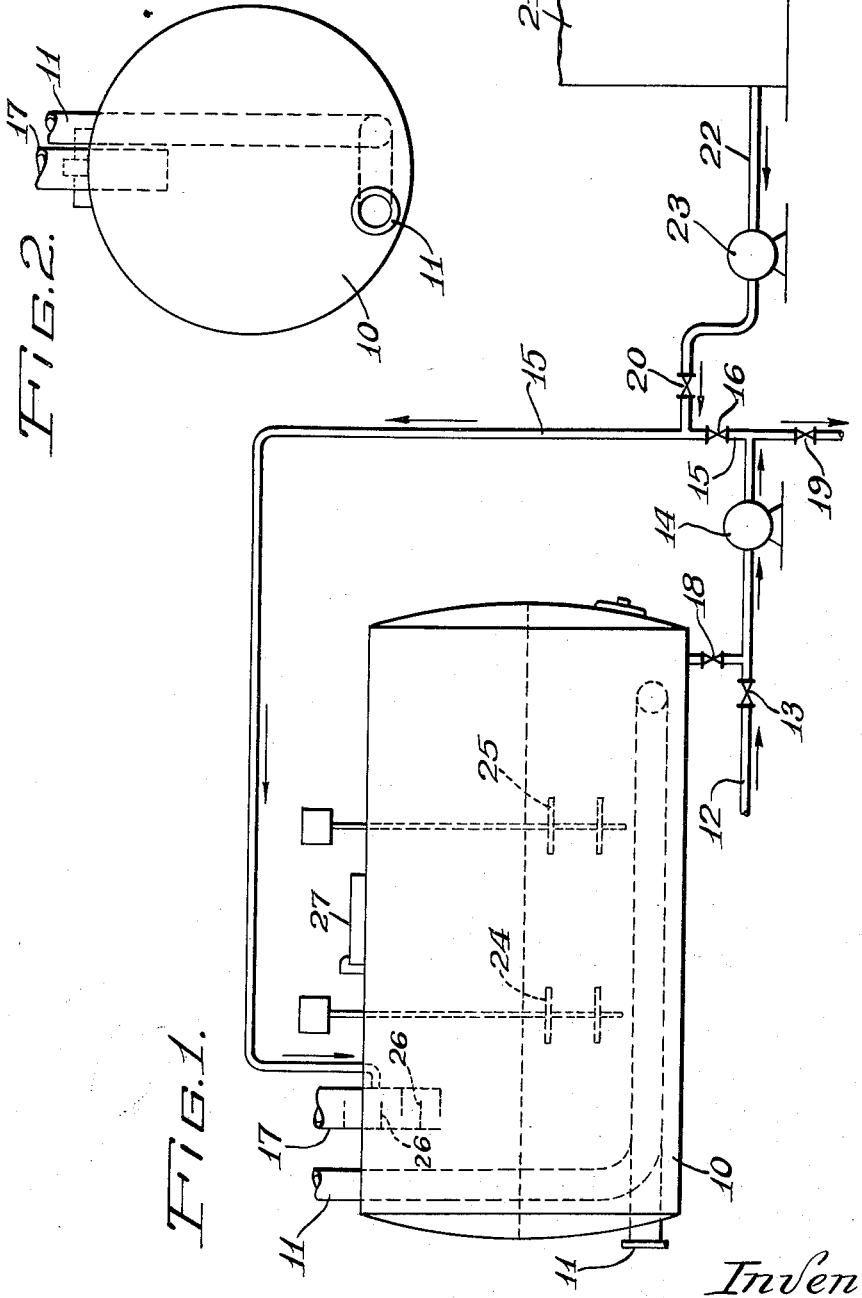

Harold B. Pullar, P.O. Box 800, and Morgan Moore, both of Magnolia, Ark.; said Moore assignor to said Pullar Filed Dec. 11, 1956, Ser. No. 627,663

5 Claims. (Cl. 260—28.5)

This invention relates to the production of composites of bituminous material and rubber, and more particularly to an improved method for incorporation or dispersion of appreciable amounts of unvulcanized rubber, either natural or synthetic, into bituminous materials which latter may range from normally liquid, free-flowing oils to normally solid asphalts and tars.

Various direct and indirect methods for combining these two classes of materials have been proposed with uses ranging from cements per se, with or without the addition of solvents or diluents, to paving composition components, and with such end objects in view as to provide the bituminous material with elasticity, increased ductility, and reduction in susceptibility to temperature extremes.

In one specific embodiment, the present invention relates to the production of liquid to semiliquid rubber-containing bituminous materials useful as such and also highly adapted as a means for incorporating rubber into bituminous materials of normally semisolid to solid character.

In another specific embodiment, the present invention relates to a method for the direct incorporation of rubber into bituminous materials of normally semisolid to solid character, such as the indicated asphalts and tars.

In another specific embodiment, the present invention relates to the production of asphalt-rubber compositions suitable for the production of emulsions therefrom characterized by ready breakability when desired and enhanced adhesiveness and toughness of films thereof.

The present invention is particularly directed to an improved process for rapidly, effectively and economically combining the rubber and the bituminous materials in desired proportion, the production of composites; for example, 85% by weight bituminous material and 15% rubber being readily feasible.

In carrying out the present process, conventional aqueous latices of natural or synthetic rubber are employed in a hot process, although it has heretofore been very difficult to use a liquid latex in such process due to the moisture content.

In general, the objects of the present invention are accomplished by continuously introducing proportional amounts of latex to a heated flowing and recirculating stream of bituminous material in a closed system, and by continuously flashing off the water in the form of steam, until the bituminous materials becomes progressively enriched with the desired amount of rubber.

The invention and its objects and advantages will be further explained in connection with the accompanying drawings, wherein:

Fig. 1 diagrammatically illustrates a side elevational view of an arrangeemnt of apparatus for carrying out the method of the present invention; and Fig. 2 is a fragmentary front elevational view thereof.

Referring to the drawings, the reference numeral 10 indicates a horizontal tank provided with heating facilities, as for example the firing tube 11. Into this tank there is first introduced the bituminous material, in normally liquid or heat-liquefied condition, as for example through line 12, valve 13, pump 14, line 15 and valve 16, and into tank 10 through enlarged baffle tube 17, while maintaining valves 18, 19 and 20 closed. The bituminous material in tank 10 is maintained at a temperature above the melting point of the bituminous material and appreciably above the boiling point of water, and suitably between 350° F. and 400° F., depending on its composition. By starting at a temperature of 400° F. and no additional heat is required during the evaporation stage and the temperature falls below the critical temperature of the rubber (approximately 350°–375° F.). A tank of for example 10,000-gallon capacity is initially provided with a batch of from 10 to 60% its capacity, and preferably approximately 25% of bituminous material for most satisfactory operation.

When the complete batch of bituminous material is introduced into tank 10 and brought up to desired temperature, valve 13, is closed and valve 18 opened so that the tank contents are continuously recirculated by means of pump 14 at a maximum rate, for example on the average of 10,000 gallons per hour. While the hot liquid bituminous material is thus recirculating, there is introduced thereto, in line 15, latex from the supply vessel 21 through line 22, pump 23 and valve 20.

The latex may have a solids content of 25 to 50% and is proportioned by proportioning pump 23 so that it will be added as fast as possible without undue foaming or carryover at the evaporator section 17. Thus, for example, the flow of latex is proportioned so that the heated materials in circulating line 15 are enriched by about ½ of 1% of latex per pass until the desired total proportion of rubber has been incorporated. When, for example, the bituminous material is normally in the form of an asphaltic oil such as a highly aromatic, heavy petroleum oil distillate, i.e., "dispersion oil," (Example: The dispersion oil used had an aromatics content of 60%, S.S.F. at 122° F.—300, flash, C.O.C., 500° F. and a gravity, ° A.P.I.—15 to which a surface active agent has been added such as Dow Corning Silicone) and it is desired to combine it in the proportion of 90 parts by weight with 10 parts by weight of rubber solids provided by a 30% solids butadiene-styrene latex, the latex is gradually introduced into the material circulating in line 15 over a period of about four hours.

As soon as the latex proportioning begins, the mixers 24 and 25 are set in operation to keep the tank contents agitated until completion of the process.

The mixture in line 15, upon return to tank 10 through the relatively enlarged baffle tube 17 impinges on the baffle plates 26 therein whereat the water content of the latex is largely flashed off in the form of steam, having been so converted by contact with the hot mixture delivered by pump 14 and under the pressure developed in the system. The dispersion of the rubber in the bituminous material is further aided by the mixing devices 24 and 25, and moisture not flashed off at the evaporator 17 is evaporated through the vent hatch 27 under the influence of the heat maintained in tank 10 by the firing tube 11.

After the entire amount of latex has been added, agitation is continued for about thirty minutes to insure substantially complete evaporation of moisture content and the mix drained from the tank 10 by for example closing valve 16 and opening valve 19, and cooled below 300° F. for subsequent use or storage. The resulting product of the indicated composition and proportion, on cooling to normal atmospheric conditions, is a semisolid viscous material. (Example: When dispersion oil has been used with the properties as previously denoted, the finished product will show a viscosity increase from 300 S.S.F. at 122° F. to S.S.F. at 400° F.—207 approximately.)

The dispersion oil preferably employed in the foregoing process is a wax-free petroleum product high in aromatics with a viscosity in the range of 100 to 500 S.S.F. at 122° F., a flash (C.O.C.) of 450° F. minimum, gravity limits of 11°–20° A.P.I. and free of impurities such as water and sediment.

Other oils derived from different crude oil stocks can be used as the dispersant for the latex, and in general with lighter oils higher rubber proportions can be combined; and conversely, lower proportions of rubber can be combined with the heavier oils ranging to the semisolid and normally solid materials, although with the latter materials the process is slower and thus not fully equivalent.

In addition to the butadiene-styrene (GRS) latex described, other latices of unvulcanized rubber can be employed. Those of natural rubber, butadiene-acrylonitrile, polybutadiene, and polyisoprene are representative examples.

Regardless of the type of oil, asphalt or other bituminous material employed as the rubber dispersant (vegetable or animal pitch or similar products being also useful), liquid latex can be effectively combined therewith without foaming or fire hazard, in relatively large proportion, in our recirculating system where the water and other volatilizable liquid material content is flashed off from the latex heated dispersant mixture in a gradual manner, leaving a rubber-containing composition substantially free of moisture.

The composition of the foregoing example can be readily liquefied by mild heating or dissolved in a hydrocarbon solvent, and employed per se as an impregnant or laminant for felted or woven fibrous materials, i.e., packaging materials or roofing, as a sealant for joints or cracks and other similar uses.

It can also with the aid of liquefying heat and emulsifying agents, such as bentonite clay, soaps or synthetic emulsifying agents, be emulsified in water to produce novel rubber emulsions in the manner as asphalts alone have heretofore been emulsified, and for the same uses. However, as distinguished from ordinary asphalt emulsions, the present combination, which is free of fillers, forms more adhesive and tougher films which break easier. Example: A suitable rubberized asphalt for road emulsions can be made by blending 80% asphalt (Smackover or Venezuelan) S.P.—120° F., pen. at 77° F.—86, 20% dispersion oil-rubber mixture to a finished asphalt with the following properties—

S.P.—109° F.
Pen. at 77° F., 100 g./5 sec.—173
Ductility at 77° F., 5 cm./min.—150+
Ductility at 39.2° F., 5 cm./min.—100+

With milling and proper soap mixtures suitable road emulsions can be made.

The same composition can be employed as a means for quickly and uniformly incorporating rubber in desired amount in an otherwise conventional mineral aggregate-containing asphalt or tar paving compositions by heating, to for example 400° F., in a conventional paving mix apparatus where rubber in the proportions of, for example, 1–6% of the entire paving composition has been found to be extremely beneficial. Since the rubber here exists already in dispersed condition with a material compatible with other bituminous paving composition components, it provides a ready means for addition to, and modification of, for example, powdered or other asphalts to provide the finished compositions with conventional 85–110 paving composition penetration. Example of paving cement: By blending 50% of 160 S.P. and 23 penetration (approximately) at 77° F. Smackover and Venezuelan asphalt with 20% of the aforementioned dispersion oil-rubber mixture a finished paving cement with the following properties can be obtained.

S.P. (R.&B.)—120° F.
Pen. at 77° F., 100 g./5 sec.—94
Ductility at 77° F., 5 cm./min.—150+
Ductility at 39.2° F., 5 cm./min.—100+

Although we have described and illustrated the preferred embodiments of our invention, it will be apparent to those skilled in the art that various changes and modifications may be made without departing from the broader scope and spirit thereof.

We claim:

1. A method of incorporating unvulcanized rubber in a body of petroleum derived oil which comprises disposing a body of a petroleum derived oil having a viscosity in the range of 100 to 500 S.S.F. at 122° F., a flash (C.O.C.) of 450° F. minimum and gravity limits of 11°–20° A.P.I. in a mixing vessel and maintaining it therein in a heated condition at a temperature of from about 350 to about 400° F., continuously withdrawing therefrom a restricted stream and returning it thereto through a relatively enlarged upwardly open baffled inlet, introducing to said body from about 10% to about 15% by weight of rubber latex solids by commingling with said first stream a continuous proportioned stream of rubber latex to heat the moisture content of the latex to above its boiling point and to cause it to be substantially completely flash evaporated therefrom upon introduction of the resulting heated oil-rubber latex mixture to said inlet, continuing said cyclic process to progressively enrich the circulating liquid by about ½ of 1% per pass until said amount of rubber has been dispersed in the body of oil, and recovering and cooling the resulting substantially moisture-free product.

2. A method of incorporating unvulcanized rubber in a body of petroleum derived oil which comprises disposing from about 85 to about 90 parts by weight of normally liquid wax-free petroleum oil distillate high in aromatics and having a viscosity in the range of 100 to 500 S.S.F. at 122° F., a flash (C.O.C.) of 450° F. minimum and gravity limits of 11°–20° A.P.I. and containing a surface active agent, in a mixing vessel and maintaining it therein in a heated condition at a temperature of from about 350 to about 400° F., continuously withdrawing therefrom a restricted stream and returning it thereto through a relatively enlarged upwardly open baffled inlet, introducing to said body from about 10 to about 15 parts by weight of rubber latex solids by commingling with said first stream a continuous proportioned stream of rubber latex to heat the moisture content of the latex to above its boiling point and to cause it to be substantially completely evaporated therefrom upon introduction of the resulting heated oil-rubber latex mixture to said inlet, continuing said cyclic process to progressively enrich the circulating liquid by about ½ of 1% of latex per pass until said amount of rubber has been dispersed in the body of oil, and recovering and cooling the resulting substantially moisture-free product.

3. The method of incorporating unvulcanized rubber in a body of petroleum derived oil which comprises disposing about 90 parts by weight of normally liquid dispersion oil having a viscosity in the range of 100 to 500 S.S.F. at 122° F., a flash (C.O.C.) of 450° F. minimum and gravity limits of 11°–20° A.P.I. in a mixing vessel and maintaining it therein in a heated condition at a temperature of from about 350 to about 400° F., continuously withdrawing therefrom a restricted stream and returning it thereto through a relatively enlarged upwardly open baffled inlet, introducing to said body about 10 parts of rubber latex solids by commingling with said first stream a continuous proportioned second stream of rubber latex over a period of about 4 hours whereby to heat the moisture content of the latex to above its boiling point and to cause it to be substantially completely evaporated therefrom upon introduction of the resulting heated oil-rubber latex mixture to said inlet, continuing said cyclic process to progressively enrich the circulating liquid until said amount of rubber has been dispersed in the body of oil, and recovering and cooling the resulting substantially moisture-free product.

4. The process of claim 1 wherein the substantially moisture-free product is dispersed with a relatively harder bituminous material by mixing them together in heat liquefied condition.

5. The process of claim 1 wherein the substantially moisture-free product is emulsified by heating and mixing it with aqueous liquid and an emulsifying agent.

References Cited in the file of this patent

UNITED STATES PATENTS

| | | |
|---|---|---|
| 1,563,410 | Weiss | Dec. 1, 1925 |
| 1,881,436 | Fischer | Oct. 11, 1932 |
| 2,504,605 | Thomas | Apr. 18, 1950 |
| 2,686,166 | Taylor | Aug. 10, 1954 |
| 2,830,963 | Traxler et al. | Apr. 15, 1958 |
| 2,921,105 | Benson | Jan. 12, 1960 |

FOREIGN PATENTS

| | | |
|---|---|---|
| 453,843 | Great Britain | Sept. 18, 1936 |